US008079450B2

(12) United States Patent
Zeilenga et al.

(10) Patent No.: US 8,079,450 B2
(45) Date of Patent: Dec. 20, 2011

(54) VISCOUS STRAND DAMPER ASSEMBLY

(75) Inventors: Chad K. Zeilenga, Crete, IL (US);
Joseph J. Bella, Peoria, IL (US); David Doornbos, Manteno, IL (US); Jeffery Cascio, Tinley Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 471 days.

(21) Appl. No.: 12/330,207

(22) Filed: Dec. 8, 2008

(65) Prior Publication Data
US 2009/0115115 A1 May 7, 2009

Related U.S. Application Data

(63) Continuation-in-part of application No. 11/546,100, filed on Oct. 11, 2006, now abandoned.

(60) Provisional application No. 60/736,236, filed on Nov. 14, 2005.

(51) Int. Cl.
*F16D 57/00* (2006.01)
*F16D 65/00* (2006.01)
(52) U.S. Cl. ...................... 188/290; 188/82.1
(58) Field of Classification Search ............ 188/72.7, 188/73.1, 77 R, 82.1, 2 D, 65.1, 166, 265, 188/290, 378, 294; 267/69; 16/49, 61, 62
See application file for complete search history.

(56) References Cited

U.S. PATENT DOCUMENTS

| | | | | |
|---|---|---|---|---|
| 1,845,513 A | * | 2/1932 | O'Connor | 188/82.3 |
| 1,954,540 A | * | 4/1934 | Sanford | 188/79.56 |
| 1,995,190 A | * | 3/1935 | Rostoker | 174/42 |
| 3,125,188 A | * | 3/1964 | Zugermayer | 188/167 |
| 3,348,638 A | * | 10/1967 | Littmann | 188/162 |
| 4,286,693 A | * | 9/1981 | Sulzer | 188/378 |
| 6,530,447 B2 | * | 3/2003 | Seki et al. | 180/233 |
| 6,666,306 B2 | | 12/2003 | Gasser | 188/82.1 |
| 6,848,759 B2 | | 2/2005 | Doornbos et al. | |
| 6,910,557 B2 | | 6/2005 | Doornbos et al. | 188/290 |
| 7,059,454 B2 | | 6/2006 | Muller et al. | 188/82.1 |
| 7,152,718 B2 | | 12/2006 | Doornbos et al. | 188/294 |
| 2003/0027662 A1 | * | 2/2003 | Werner et al. | 473/346 |
| 2003/0199966 A1 | * | 10/2003 | Shiu et al. | 623/1.12 |

OTHER PUBLICATIONS

International Search Report and Written Opinion for PCT/US2006/043337.

* cited by examiner

*Primary Examiner* — Melody Burch
(74) *Attorney, Agent, or Firm* — Mark W. Croll; Paul F. Donovan

(57) ABSTRACT

A damper assembly includes a fixed rack gear, a rotary gear damper having a gear engaged with the rack gear, and a tether movable with the damper along the rack gear and connected to the movable object to be controlled by the damper. A biasing element normally urges the damper away from anti-rotation locking members.

15 Claims, 5 Drawing Sheets

VISCOUS STRAND DAMPER ASSEMBLY

CROSS-REFERENCE TO RELATED APPLICATIONS

This application is a Continuation-In-Part of U.S. patent application Ser. No. 11/546,100 filed on Oct. 11, 2006, now abandoned, which claims the benefit of U.S. Provisional Application Ser. No. 60/736,236 filed on Nov. 14, 2005. The contents of all such referenced patent applications are hereby incorporated by reference in their entirety as if fully set forth herein.

FIELD OF THE INVENTION

The present invention relates generally to dampers for controlling movement of things, and, more particularly, the invention pertains to viscous dampers that use a tether for attachment between the device to be controlled and the damper.

BACKGROUND OF THE INVENTION

It is known to use movement dampers in a wide variety of assemblies to control the movement of assembly components. In some situations, dampers are used to control movements of components that would otherwise move more suddenly and forcefully than desired. The damper may control movement caused by gravitational forces or movement induced by springs or other actuators. Doors, drawers and pullouts in furniture are known applications for dampers. In automobiles, dampers are known for use on glove box doors, console covers, sunglass bins, retractable cup holders and other storage bins or areas.

Various types of dampers are known, including different types of both one-way and two-way dampers. As the names imply, a one-way damper controls movement in only one direction while applying minimal resistance to movement in a return direction, and a two-way damper provides resistance or control of movement in both directions.

Viscous dampers are known. In a viscous damper a rotor is rotatable within a housing that contains a viscous damping fluid. Internal structures of the rotor and/or housing establish ports for relative movement of the damping fluid and rotor, thereby providing a desired degree of resistance or "damping".

The various damper types have worked effectively in many applications. However, there are ever increasing demands necessitating new and improved damper designs. For example, in automobiles space is at a premium. It is desirable to maximize interior passenger space as well as storage space. Accordingly, it is desirable that dampers be small or operate within areas that do not detract from otherwise usable cabin space.

Some prior damping systems, especially pneumatic dampers, do not start smoothly. The damping performance may begin some time after movement has started. In some situations it is desirable for damping to begin immediately without delay.

SUMMARY OF THE INVENTION

The present invention provides a conventional viscous damper moveable along a path and fastened by a tether to the item the movement of which is being controlled.

In one aspect thereof, the present invention provides a damper assembly with a fixed base having a rack gear, a carriage movable relative to the base and a rotary damper carried by the carriage. The damper has a rotor and a damper gear rotatable with the rotor. The damper gear is engaged with the rack gear on the base. A tether is connected to the carriage.

In another aspect thereof, the present invention provides a damper assembly with a fixed rack gear; a rotary damper having a rotor and a damper gear rotatable with the rotor, the damper being movable along the rack gear; and a tether substantially connected for movement with movement of the damper relative to the rack gear.

In a still further aspect thereof, the present invention provides a damper assembly with a fixed track, a fixed rack gear, a carriage having a follower slidingly engaged with the track, a rotary damper having a damper gear engaged with the rack gear, the damper being movable with the carriage, and a tether connected to the carriage at one end and having a second end attachable to a movable object to be controlled by the damper assembly.

In yet a further aspect, the present invention provides a damper assembly with a base having a rack gear, a carriage movable relative to the base and a rotary damper carried by the carriage within a well. A biasing element operatively engages the rotary damper and normally urges the rotary damper away from locking ribs in the well.

An advantage of the present invention is providing a damper that can be mounted remotely from the item to be controlled in an area otherwise unused, and which does not detract from usable space in the item or the environment around it.

Another advantage of the present invention is providing a damper that operates smoothly without startup variances.

Still another advantage of the present invention is providing a damper system that can be used with different types of dampers, including both one-way and two-way dampers.

Yet another advantage of the present invention is providing a damper that avoids chatter between a damper and locking ribs during free-running movement.

Other features and advantages of the invention will become apparent to those skilled in the art upon review of the following detailed description, claims and drawings in which like numerals are used to designate like features.

Figure 1:
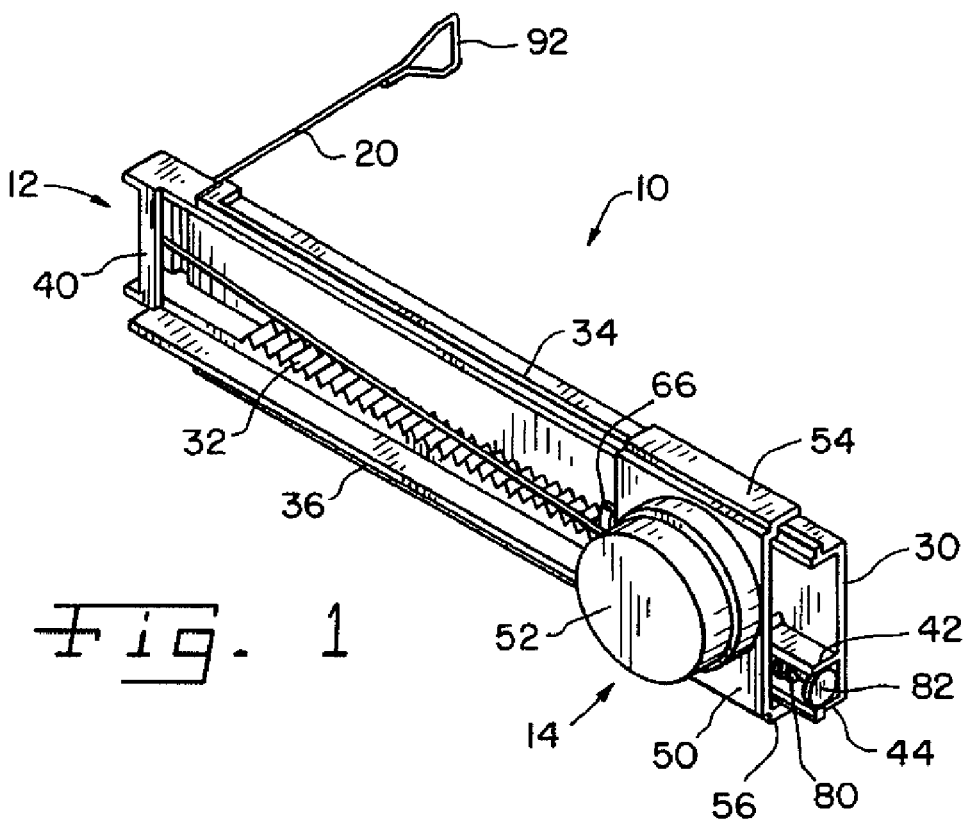
FIG. 1 is a perspective view of a viscous strand damper assembly in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
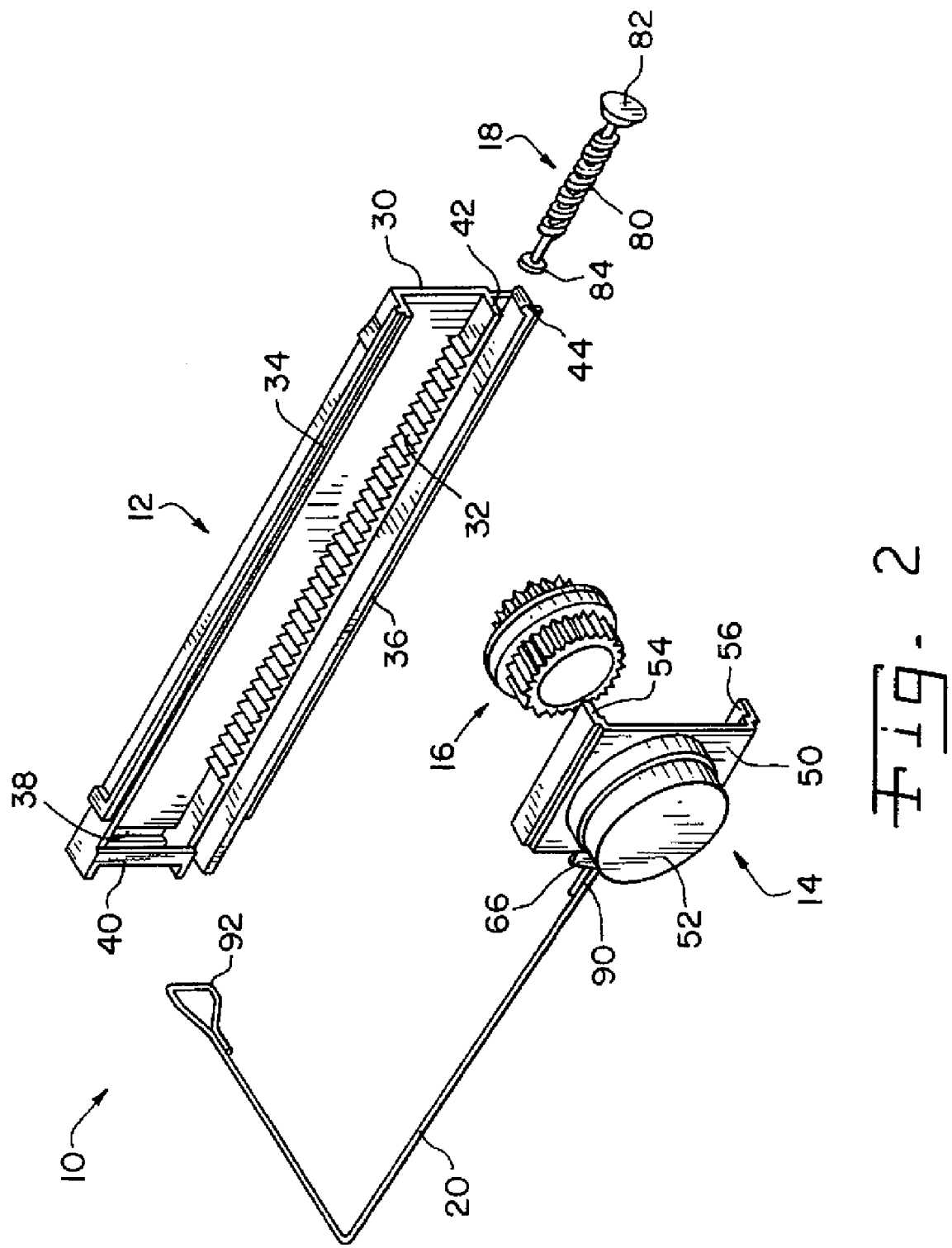
FIG. 2 is an exploded view of the viscous strand damper assembly shown in FIG. 1.

Referring now more specifically to the drawings and to FIGS. 1 and 2 in particular, numeral 10 designates a viscous strand damper assembly in accordance with the present invention. Damper assembly 10 includes a base 12 by which damper assembly 10 is positioned and mounted for use. A carriage 14 moves is engaged with base 12, and moves back and forth along base 12 via the interrelationship of a damper 16 carried within carriage 14 and operable along base 12. In the exemplary embodiment, a spring 18 is provided for moving carriage 14 in one direction; however, it should be understood that other return structures can be used. A tether 20 is connected to carriage 14 at one end thereof and to the item to be controlled at another end thereof.

Base 12 includes a base plate 30 for mounting assembly 10 in the vicinity of the article the movement of which is to be controlled. Accordingly, base plate 30 can be provided with suitable structures (not shown) such as holes for fasteners, integral snap connectors or the like by which fastening of base plate 30 to another object can be achieved. Base 12 defines a rack gear 32 for engaging damper 16 as will be described more fully hereinafter. Rack gear 32 extends from near one end of base 12 to near the opposite end of base 12. A first track 34 along one edge of base plate 30, and a second track 36 along an edge of base plate 30 opposite to the edge having track 34 are provided for engaging carriage 14. At one end thereof, base 12 further defines a slot 38 and a guide 40 for guiding and directing tether 20. At an opposite end, base 12 defines spring mounts 42, 44.

Carriage 14 is shaped to contain damper 16 and operate therewith while slidingly engaging base 12 and traversing along base 12. Accordingly, carriage 14 includes a main body 50 having a well 52 for operating with damper 16. A first follower 54 on a first edge of body 50 rides along first track 34 of base 12. A second follower 56 on an edge of body 50 opposite the edge having follower 54 rides along second track 36 of base 12. Those skilled in the art will readily understand that various structures can be used for providing a physical engagement, yet sliding relationship between carriage 14 and base 12 via tracks 34, 36 and followers 54, 56. For example, overlapping lips can be used, allowing carriage 14 to be snap connected on to base 12, yet being slidable along base 12 after being engaged therewith.

Figure 4:
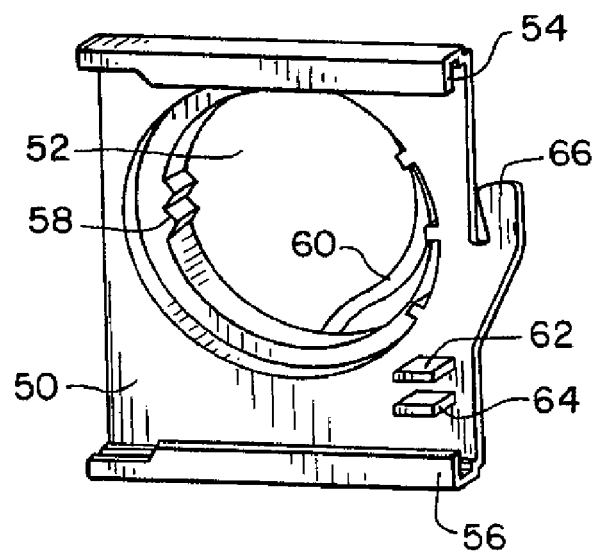
FIG. 4 is a perspective view of the carriage shown in FIG. 2, but again illustrating the side opposite the side shown in FIG. 2.

Well 52 is a hollow depression or pocket for receiving damper 16 therein. Well 52 includes on the inside thereof (FIG. 4) locking ribs 58 and free running ribs 60, the operation of which will be described more fully hereinafter. Carriage 14 further includes spring mounts 62, 64 and an arm 66.

Damper 16 is a rotary gear damper having an outer shell or housing 70, which may be multiple components fastened one to another by, for example, ultrasonic welding. Housing 70 defines ribs 72, which in the exemplary embodiment surround housing 70 at one end of damper 16. Ribs 72 are fixed elements with respect to housing 70 and can be integral formations in housing 70. Damper 16 further includes a rotor 74 which is rotatable in housing 70 and extends outwardly of housing 70. A damper gear 76 is mounted on rotor 74 for rotation therewith. Damper 16 is a viscous rotary gear damper containing a damping fluid (not shown) within housing 70 and associated structures (not shown) of housing 72 and/or rotor 74 to provide resistance to relative rotation between housing 70 and rotor 74. Those skilled in the art will understand readily the nature of and internal structures for the operation of damper 16, which in some applications and uses of the present invention can be a one-way or a two-way damper.

Spring 18 has a spring body 80, a first spring end 82 securable to spring mounts 42, 44 and a second spring end 84 securable to spring mounts 62, 64. In the exemplary embodiment, spring body 80 is a helical coil spring; however, those skilled in the art will understand that retraction elements or structures other than a spring also can be used, such as, for example, an elastic member.

Figure 5:
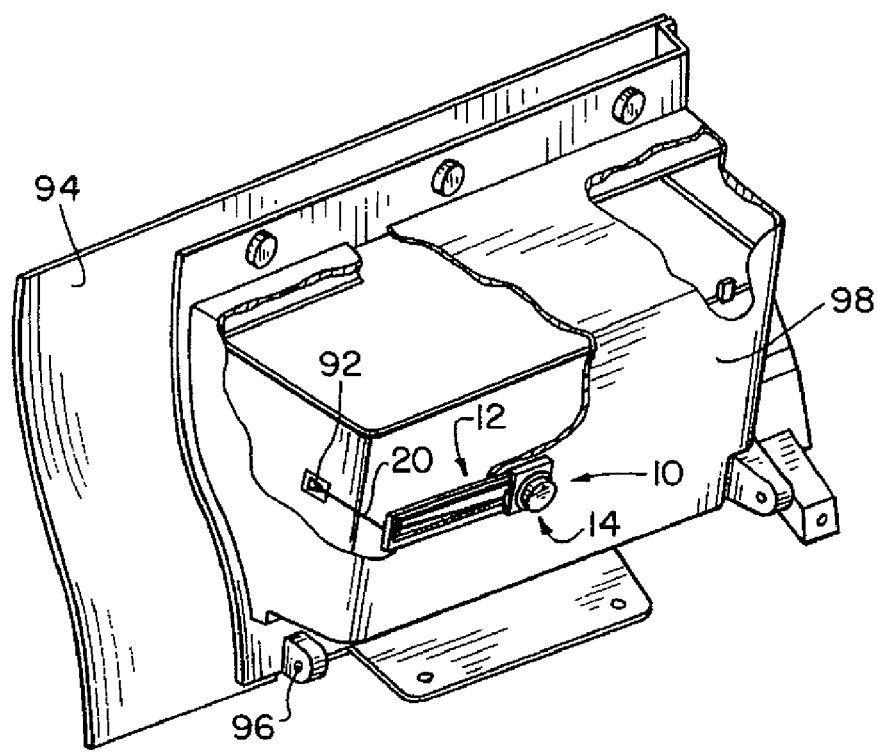
FIG. 5 is a perspective view, partly broken away, of a viscous strand damper assembly in accordance with the present invention shown installed for controlling opening of an automobile glove box, with the glove box being illustrated in a closed condition.
Figure 6:
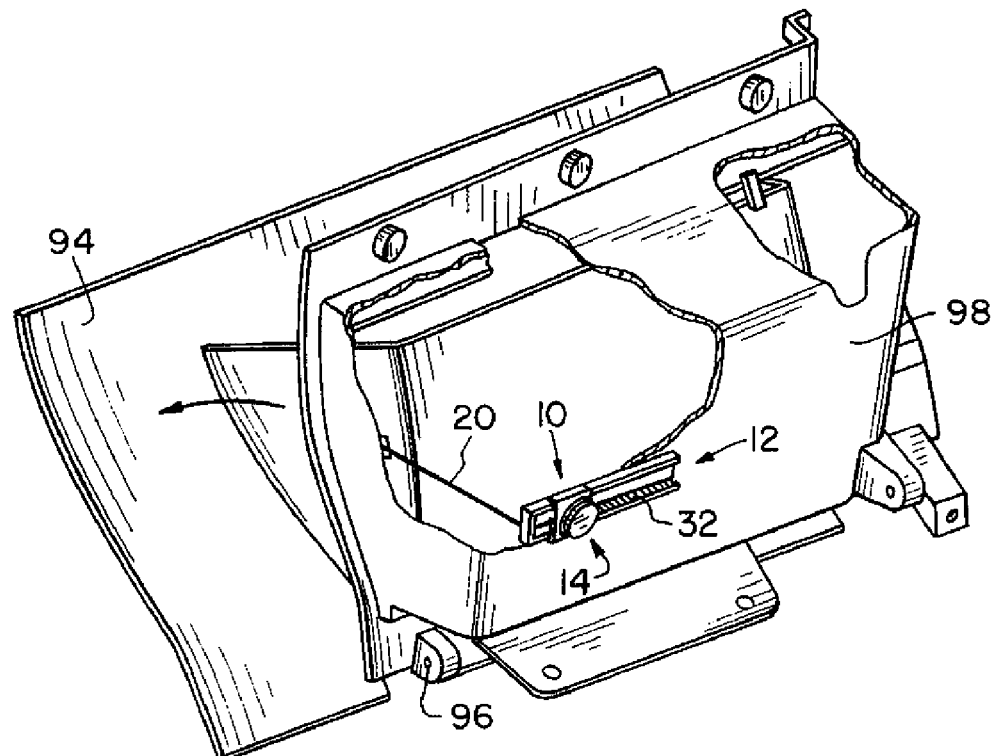
FIG. 6 is a perspective view similar to that of FIG. 5, but illustrating the glove box in an open condition.

Tether 20 is a string, wire, cable, strap or the like with a first end 90 connected to arm 66 and a second end 92 connected to the item, device or thing, the movement of which is to be influenced by damper 16. In the exemplary embodiment (FIGS. 5 and 6), second end 92 of tether 20 is connected to a bin 94 such as a vehicle glove box rotatably connected via a hinge 96 to fixed structure 98.

In the assembled form of damper assembly 10, followers 54, 56 engage tracks 34, 36 to secure carriage 14 on base 12 while allowing axial translation of carriage 14 along base 12. Damper 16 is contained between well 52 and base plate 30, with gear 76 of damper 16 engaged with rack gear 32. Spring 18 is interconnected between base 12 and carriage 14 via spring ends 82, 84 secured between spring mount pairs 42, 44 and 62, 64, respectively. Tether 20 is connected to arm 66 of carriage 14 and extends along base 12 to slot 38 and guide 40, where it is routed or directed to the item to be controlled, bin 94 in the example shown, to which second end 92 is attached.

In the exemplary embodiment, a one-way damper installation is shown. As glove box or bin 94 is opened, string 20 is pulled, pulling on carriage 14 via the connection of tether 20 and arm 66. Carriage 14 begins moving along base 12, and the slight relative movement between carriage 14 and damper 16 causes locking ribs 58 on carriage 14 to engage some of ribs 72 on damper housing 70. Accordingly, housing 70 is restrained from rotation within well 52, and as gear 76 is pulled along rack gear 32 rotor 74 is caused to rotate in housing 70. The damping effect of damper 16 is transmitted to the pivotal movement of glove box/bin 94 about hinge 96 via the rotational resistance of rotor 74 in housing 70, which resists rotation of gear 76 and thereby the movement of gear 76 along rack gear 32. In turn, resistance is applied to the movement of carriage 14 along base 12, which is transferred to the opening of bin 94 via tether 20.

When glove box/bin 94 is moved to close, tension on tether 20 from bin 94 is released. Spring 18 pulls carriage 14 in the opposite direction from that described previously. Slight relative movement between carriage 14 and damper 16 as carriage 14 is urged by spring 18 causes locking ribs 58 on carriage 14 to disengage from ribs 72 on damper housing 70. Ribs 72 of housing 70 may confront free running ribs 60 in well 52, but do not engage free running ribs 60. Ribs 72 can move relative to free running ribs 60. Accordingly, minimal resistance is applied to rotation of housing 70 within well 52. The rotation of rotor 74 within housing 70 is subjected to greater resistance via than the resistance to rotation of housing 70 within well 52, and as spring 18 pulls carriage 14 and gear 76 moves along rack gear 32 little or no relative rotation occurs between rotor 74 and housing 70. Instead, housing 70 rotates within well 52. As a result, no damping effect is applied to the return of carriage 14.

Figure 3:
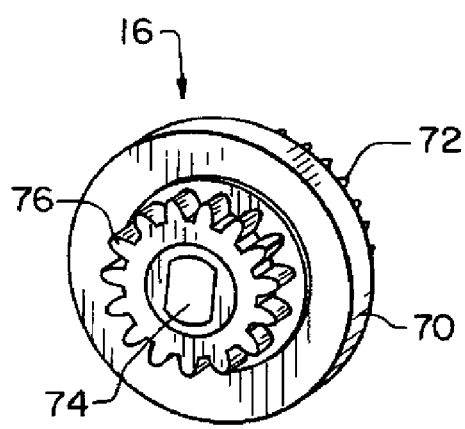
FIG. 3 is a perspective view of the damper shown in the exploded view of FIG. 2, but illustrating the side opposite the side shown in FIG. 2.
Figure 7:
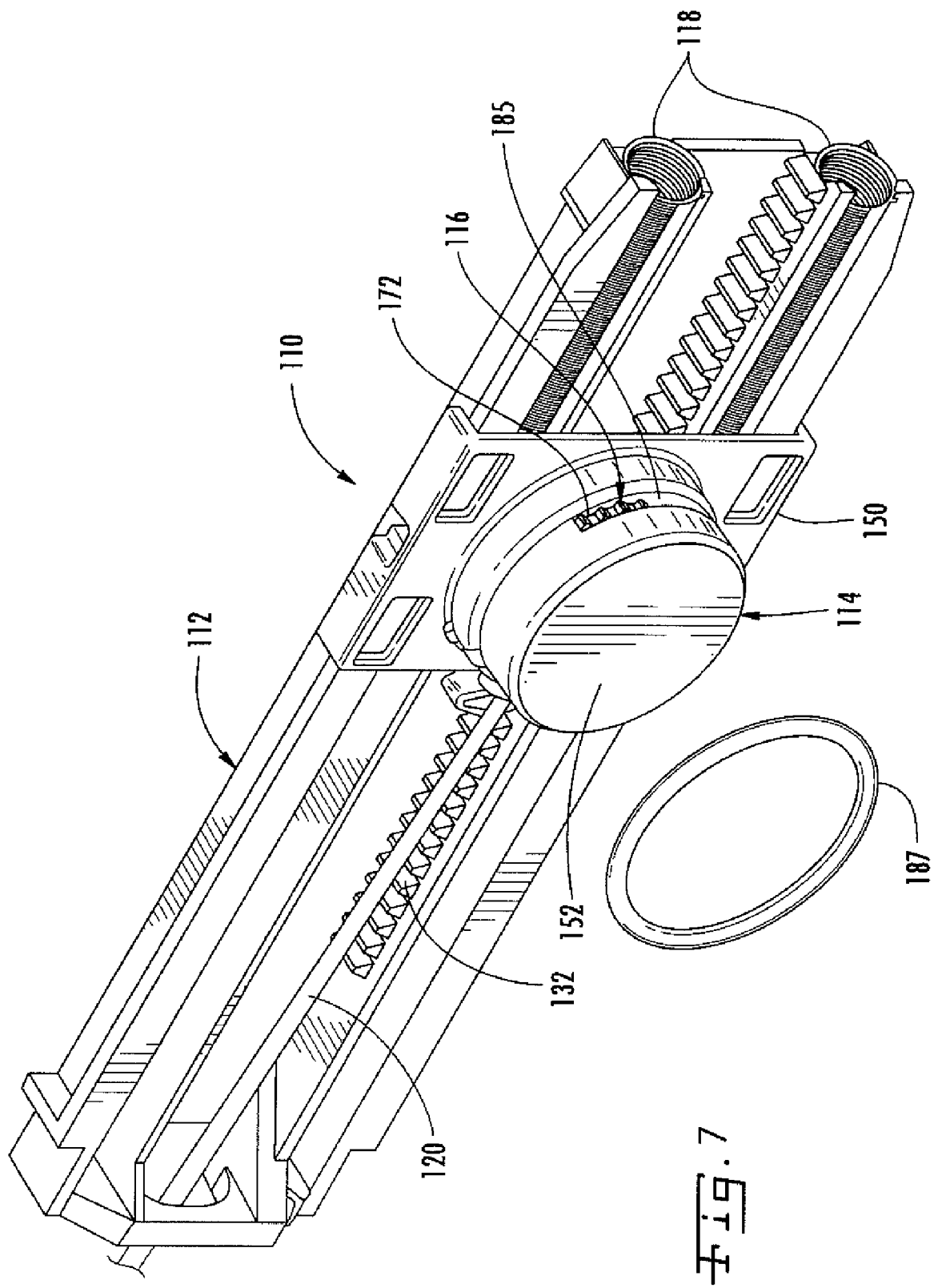
FIG. 7 is a partially exploded perspective view of a viscous strand damper assembly in accordance with the present invention incorporating a biasing ring element.
Figure 8:
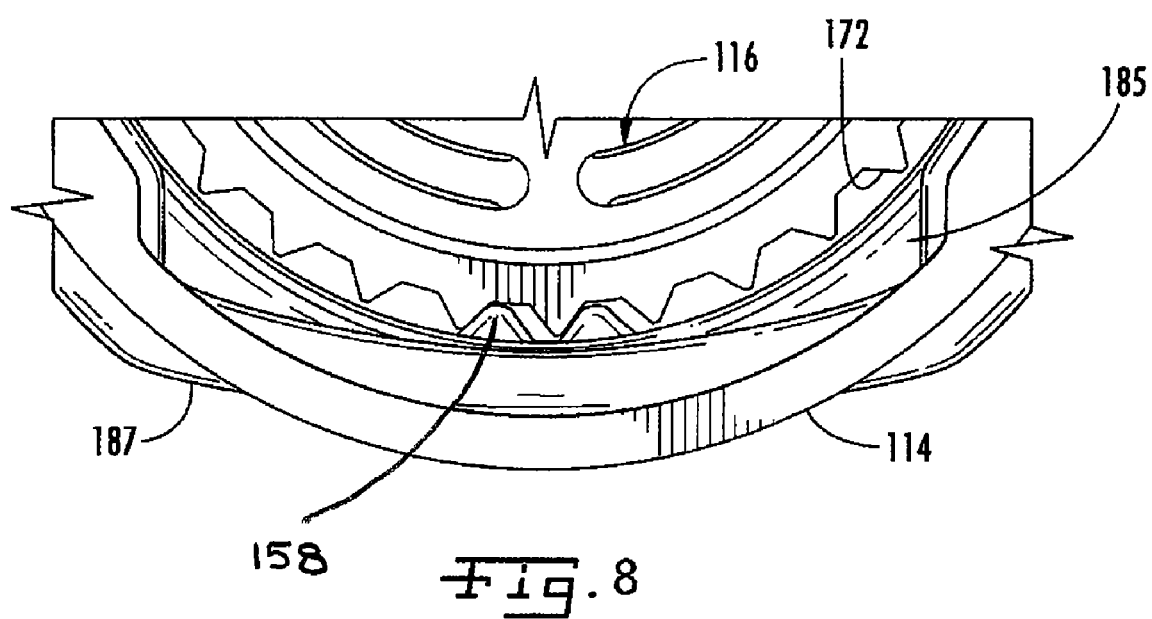
FIG. 8 is a cut-away view showing the biasing ring element in engaging relation with the damper.

Referring now to FIGS. 7 and 8, another exemplary embodiment for a damper assembly 110 consistent with the present invention is shown. In this exemplary embodiment, elements corresponding to those previously described are designated by like reference numerals within a 100 series. In the illustrated arrangement the damper assembly 110 operates in substantially the same manner as previously described such that carriage 114 is engaged with base 112, and moves back and forth along base 112 via the interrelationship of damper 116 and gear rack 132. In this regard, damper 116 has a construction as illustrated in FIG. 3, and is carried within well 152 of carriage 114.

In the exemplary embodiment illustrated in FIGS. 7 and 8, well 152 includes a slot opening 185 disposed partially around the perimeter of well 152. As shown, slot opening 185 provides access to ribs 172 housed at the interior of well 152. As illustrated, slot opening 185 is disposed along a segment of the perimeter of well 152 which faces generally in the direction of free-running movement by carriage 114 when tension on the tether 120 is released.

As shown, the exemplary embodiment illustrated in FIGS. 7 and 8 also includes a biasing element 187 such as an elastomeric ring or the like which is adapted to fit in tensioned relation about the exterior of well 152 such that a portion of biasing element 187 resides in tensioned relation within slot opening 185. As best understood with reference to FIG. 8, in the exemplary arrangement, the portion of biasing element 187 residing within slot opening 185, on account of its elastic nature, normally attempts to adopt a generally linear configuration and presses against ribs 172 on the damper housing. Therefore, in the free-running condition, the biasing element 187 tends to urge damper 116 generally away from the locking ribs 158 (also shown as ribs 58 in FIG. 4). However, some degree of relative movement between carriage 114 and damper 116 is nonetheless retained.

In operation of the exemplary embodiment shown in FIGS. 7 and 8, when tension is applied to the tether 120, the slight relative movement between carriage 114 and damper 116 allows locking ribs 158 (shown as 58 in FIG. 4) to engage some of ribs 172 on the damper housing thereby providing the desired rotational restraint as carriage 114 is pulled back (i.e. to the left in FIG. 7). During this relative movement, the biasing element 187 moves with carriage 114 thereby causing the portion of biasing element 187 within slot opening 185 to bulge slightly outwardly as it presses against ribs 172. In this regard, it will be understood that the pulling force on carriage 114 applied through tether 120 is sufficient to overcome the biasing force provided by biasing element 187.

When tension on tether 120 is released, springs 118 urge carriage 114 in the free-running direction (i.e. to the right in FIG. 7). In the absence of the applied tension through tether 120, the locking ribs are allowed to disengage from ribs 172 on the damper housing. During movement of carriage 114 and damper 116 in the free-running direction, the biasing element 187 urges damper 116 generally away from the locking ribs and towards the free running ribs. By urging damper 116 away from the locking ribs during free-running movement, the potential for unintended engagement between ribs 172 and the locking ribs is reduced thereby reducing the potential for "chatter" and/or damage caused by partial engagement.

It should be understood that two-way damping can be provided by the use of a two-way damper and restraint of relative rotation between the damper housing and the carriage as the carriage moves in either direction on base 12. For example, the two-way damper housing can be permanently fixed to the carriage via fastening, adhesion or rigid engagement. In one embodiment, the carriage can also be the damper housing in a two-way application. Also, springs 18 and 118 may aid in damping by providing resistance as the associated member, glove box or door is opened.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A damper assembly comprising:
   a fixed base having a rack gear;
   a carriage movable relative to said base;
   a rotary damper carried by said carriage, said damper having a rotor and a damper gear rotatable with said rotor, said damper engaged with said rack gear on said base, said carriage having a well with locking ribs in said well and said damper having ribs on an outer surface thereof for engaging said locking ribs in said well for restraining relative rotation between said damper and said well;
   a biasing element comprising an elastomeric ring operatively engaging said rotary damper, said biasing element normally urging said rotary damper away from said locking ribs in said well, wherein said elastomeric ring is disposed at least partially about said well, and a portion of said elastomeric ring is disposed within a slot opening extending into said well; and
   a tether from said carriage.

2. The damper assembly of claim 1, said base having at least one track and said carriage having a follower engaged with said track.

3. The damper assembly of claim 2, wherein said at least one track of said base includes first and second tracks along opposite edges and said carriage having first and second followers engaged with said first and second tracks.

4. The damper assembly of claim 2, including a spring connected between said base and said carriage.

5. The damper assembly of claim 1, including a spring connected between said base and said carriage.

6. The damper assembly of claim 1, including a spring connected between said base and said carriage.

7. The damper assembly of claim 6, said base having first and second tracks along opposite edges and said carriage having first and second followers engaged with said first and second tracks.

8. A damper assembly comprising:
   a fixed rack gear;
   a carriage;
   a rotary damper having a rotor and a damper gear rotatable with said rotor, said damper being movable along said rack gear, said carriage having a well with locking ribs in said well and said damper having ribs on an outer surface thereof for engaging said locking ribs in said well for restraining relative rotation between said damper and said well;

a biasing element contacting a portion of said rotary damper, said biasing element normally urging said rotary damper away from said locking ribs in said well wherein said biasing element comprises an elastomeric ring, said elastomeric ring being disposed at least partially about said well, a portion of said elastomeric ring disposed within a slot opening extending into said well; and a tether substantially connected for movement with movement of said damper relative to said rack gear.

9. The damper assembly of claim 8, said damper having a housing with said rotor being rotatable in said housing; and said damper being carried by said carriage.

10. The damper assembly of claim 9, said tether being connected to said carriage.

11. The damper assembly of claim 8, including a spring connected at one end to said carriage and having an opposite end fixed in position relative to said rack gear.

12. A damper assembly comprising:
a fixed track;
a fixed rack gear;
a carriage having a follower slidingly engaged with said track;
a rotary damper having a damper gear engaged with said rack gear, said damper being movable with said carriage, said carriage having a well with locking ribs in said well and said damper having ribs on an outer surface thereof for engaging said locking ribs in said well for restraining relative rotation between said damper and said well;

a biasing element contacting a portion of said rotary damper, said biasing element normally urging said rotary damper away from said locking ribs in said well, said biasing element being disposed at least partially about said well, a portion of said biasing element disposed within a slot opening extending into said well; and a tether connected to said carriage at one end and having a second end attachable to a movable object to be controlled by said damper assembly.

13. The damper assembly of claim 12, said rotary damper having a housing selectively engagable with said carriage, and said housing being selectively rotatable and non-rotatable relative to said carriage.

14. The damper assembly of claim 13, including a retraction element connecting said carriage and a fixed point relative to said rack gear.

15. The damper assembly of claim 14, including a second fixed track, said rack gear disposed between said fixed tracks, and said carriage having a second follower engaged with said second fixed track.

* * * * *